(12) United States Patent
Bollinger et al.

(10) Patent No.: US 8,951,305 B2
(45) Date of Patent: Feb. 10, 2015

(54) METHOD OF PRODUCING NATURALLY PURIFIED SALT PRODUCTS

(75) Inventors: Matthew L. Bollinger, Walnut Creek, CA (US); Nicole M. Durch, Fremont, CA (US); Robert Sung Lee, Fremont, CA (US)

(73) Assignee: Cargill, Incorporated, Wayzata, MN (US)

(*) Notice: Subject to any disclaimer, the term of this patent is extended or adjusted under 35 U.S.C. 154(b) by 337 days.

(21) Appl. No.: 13/322,762

(22) PCT Filed: May 26, 2010

(86) PCT No.: PCT/US2010/036193
§ 371 (c)(1),
(2), (4) Date: Nov. 28, 2011

(87) PCT Pub. No.: WO2010/138583
PCT Pub. Date: Dec. 2, 2010

(65) Prior Publication Data
US 2012/0066868 A1    Mar. 22, 2012

Related U.S. Application Data

(60) Provisional application No. 61/182,342, filed on May 29, 2009.

(51) Int. Cl.
*C01F 5/34* (2006.01)
*C01D 3/18* (2006.01)
*C01D 3/14* (2006.01)
*C01F 5/40* (2006.01)

(52) U.S. Cl.
CPC ... *C01F 5/40* (2013.01); *C01D 3/18* (2013.01); *C01D 3/14* (2013.01)
USPC ............................ 23/304; 23/293 R; 423/554

(58) Field of Classification Search
USPC ...................... 23/304, 293 R; 423/554, 499.4
See application file for complete search history.

(56) References Cited

U.S. PATENT DOCUMENTS 5,281,242 A   1/1994   Sadan
5,447,543 A   9/1995   Sadan

FOREIGN PATENT DOCUMENTS

CN   1035096 A   8/1989
CN   1102600 A   5/1995

OTHER PUBLICATIONS

J. A. Fernandez-Lozano: "Recovery of Epsomite and Sylvite from Seawater Bittern by Crystallisation," Fourth International Symposium on Salt, Northern Ohio Geological Society, vol. 2, 1974, pp. 501-510.
Chemical Abstracts, vol. 69, No. 1, Jul. 1, 1968, Columbus, Ohio, US; abstract No. 4034m, Lad K.V. et al 'Epsom salt from sels mixts' p. 396 ; & Chem. Age India, vol. 19, No. 1, 1968 pp. 33-38.
'Production of Marine Chemicals in Pakistan Part III. Studies on the Recovery of Magnesium Sulphate by Chilling', Mirza Arshad Ali Beg et al., Pak. j. sci. res., vol. 32, No. 2, Feb. 1989, pp. 126-132.
'Products Derived from Mother Water', http://www.salins.com/popup.php?id=8&width=520&height=500, Oct. 15, 2007.
The Egyptian Salts & Minerals Company At Fayoum, http://www.emisalegypt.com/projects.htm, Oct. 15, 2007.
International Search Report for PCT/US2010/036193 (2 pages).

*Primary Examiner* — Edward Johnson

(57) ABSTRACT

In one embodiment, a method for producing a naturally purified salt product such as magnesium sulfate heptahydrate, wherein the salt mixture is treated with a solution comprising magnesium chloride; the first slurry is separated to provide a second slurry, which is further separated to yield a first liquid stream; the first liquid stream is crystallized to provide the naturally purified salt product. In another embodiment, a high purity salt product is produced. In another embodiment, other products that are produced include naturally purified sodium chloride and magnesium chloride.

20 Claims, 2 Drawing Sheets

METHOD OF PRODUCING NATURALLY PURIFIED SALT PRODUCTS

CROSS REFERENCE TO RELATED APPLICATION

This application claims the benefit of the PCT Patent Application, Ser. No. PCT/US2010/036193, filed 26 May 2010, entitled METHOD OF PRODUCING NATURALLY PURIFIED SALT PRODUCTS, which claims the benefit of the U.S. Provisional Patent Application, Ser. No. 61/182,342, filed 29 May 2009, entitled METHOD OF PRODUCING A NATURALLY PURIFIED SALT PRODUCT, which are hereby incorporated by reference in their entirety.

FIELD

The present disclosure relates generally to producing naturally purified salt products such as magnesium sulfate heptahydrate from mixtures of various salts. Aspects of the disclosure are particularly directed to production of a high purity salt product. The present disclosure also relates to the recovery of other salts from the process, including sodium chloride and magnesium chloride. The process makes use of natural compounds, such as those produced from sea water, as starting materials and throughout the process.

BACKGROUND

Salt production methods seek to maximize the various commercial products that can be recovered from salt mixtures, but struggle to find methods that are as efficient and as cost-effective as possible. Moreover, there is growing awareness of the need to develop sustainable processes that are environmentally-friendly.

Sodium chloride can be recovered from a salt water source such as sea water, salt lake water, brine wells, underground deposits, etc., through evaporation of water and manual recovery of the sodium chloride. For example, sodium chloride is generally the first significant compound precipitated from the evaporation of sea water in salt ponds. However, other mixed salts can then be precipitated from the remaining brine. These mixed salts can comprise any number of salts, including sodium chloride (also called Halite or NaCl), magnesium sulfate ($MgSO_4$), magnesium chloride (MgCl), potassium chloride (KCl), magnesium sulfate heptahydrate (Epsom salts or Epsomite, $MgSO_4.7H_2O$), magnesium sulfate hexahydrate (Hexahydrate, $MgSO_4.6H_2O$), magnesium sulfate monohydrate (Kierserite, $MgSO_4.1H_2O$), as well as double salts such as potassium sulfate dimagnesium sulfate (Langbeinite, $K_2SO_4.2MgSO_4$), potassium chloride plus sodium chloride (Sylvinite, KCl+NaCl), sodium magnesium sulfate (Bloedite or Astrakanite, $Na_2SO_4.MgSO_4.4H_2O$), sodium sulfate ($NaSO_4$) and potassium magnesium chloride sulfate (Kainite, $4KCl.4MgSO_4.11H_2O$). These salts can be either in solid form or can be found in solution as separate ions, such as sodium, magnesium, potassium, calcium, chloride, sulfate, and carbonate.

Several of these compounds have commercial value, but their recovery from these types of salt mixtures can be challenging. Further recovery of sodium chloride has obvious commercial value. Magnesium sulfate salts and hydrates such as Epsom salts also have several uses including as bath salts, laxatives, fertilizers, animal feeds and detergent fillers. Magnesium chloride can be used as a dust suppressant, deicer, anti-icer, or a pre-wetting agent. Some of the issues encountered when trying to recover these products from the salt mixture include the similar chemistry between sodium and magnesium ions, the tendency of Epsomite and sodium sulfate to form double salts such as Astrakanite, the various hydrate forms that magnesium sulfate can be found in, the energy requirements to separate the compounds, and the residual by-products produced from known methods.

Due to these significant limitations, few commercial processes exist for the recovery of such salts from naturally-occurring salt mixtures. As a result, salts such as magnesium sulfate are usually made via other means. The most common method of producing magnesium sulfate is through the chemical process of reacting sulfuric acid with either magnesium oxide or magnesium carbonate. This industrial method is expensive, and may also result in heavy metals in the product due to contamination in the feed stocks, which then have to be removed via further processing.

Another common process used to produce compounds such as magnesium sulfate and Epsom salts from salt mixtures such as salt ponds is to subject the salt mixture to further evaporation, refrigeration, and re-crystallization (see, e.g., Fernandez-Lozano, J. A. "*Recovery of Epsomite and Sylvite From Seawater Bittern by Crystallization.*" Fourth Symposium on Salt, Alan H. Coogan, The Northern Geological Society, Inc. Cleveland, Ohio, vol. 2, pp. 501-510 (1974)). Following evaporation, the mixture is diluted by adding fresh water to control precipitation of sodium chloride. It is then cooled below ambient temperatures (typically below $-5°$ C.) to separate the magnesium sulfate compounds from the other compounds, followed by re-crystallization. Among the drawbacks of this process are the costs involved in the refrigeration process and the fouling of the heat exchanger due to encrustation of solids on the surface (often referred to as scaling). Another drawback is that the solid-liquid separations are more difficult at cooler temperatures due to increased viscosity of the magnesium chloride brine. In addition, the yield (or product recovery) is significantly less in this refrigeration process than in the present invention. Moreover, this refrigeration process is suitable only for the recovery of Epsom salt and liquid magnesium chloride, whereas the present invention can recover Epsom salt, sodium chloride and liquid magnesium chloride.

One process disclosed in U.S. Pat. No. 5,281,242 involves treating a starting two compound mixture of magnesium sulfate heptahydrate ($MgSO_4.7H_2O$) and sodium chloride (NaCl) by applying heat to the mixture in order to convert the magnesium sulfate heptahydrate into clusters of lower hydrate compounds such as magnesium sulfate hexahydrate ($MgSO_4.6H_2O$), magnesium sulfate monohydrate ($MgSO_4.1H_2O$) or anhydrous magnesium sulfate ($MgSO_4$). Pressure is then applied to the magnesium sulfate clusters to form fine crystals, followed by size separation (such as sieve or screening) and recovery of the magnesium sulfate crystals from the sodium chloride crystals. In order to obtain Epsomite, the magnesium sulfate crystals need to be further processed by re-crystallizing the crystals. One limitation of this process is that it is limited to a starting material consisting only of Epsomite and Halite (many naturally-occurring starting materials consist of several different types of salts as described above). Another limitation is that the temperature and pressure applied to the hydrate clusters and crystals has to be controlled in order to obtain the appropriate magnesium sulfate hydrate salt. Finally, this is a solid-solid separation process that does not involve the use of liquids in contrast to the present invention.

SUMMARY

The present disclosure relates to a method of producing naturally purified salt products from a salt mixture by treating the salt mixture with a solution, where at least a portion of the solution comprises magnesium chloride, at a raised temperature to form a first slurry. This first slurry undergoes a first separation step to yield a first solid, where sodium chloride comprises at least a portion of the first solid, and a second slurry. Next, a second separation step of the second slurry yields a second solid and a first liquid stream. The first liquid stream then undergoes a crystallizing of a third solid in the first liquid stream to yield a third slurry. A third separating step of the third slurry yields a second liquid stream and a third solid, where at least a portion of the second liquid stream comprises magnesium chloride and the third solid comprises a naturally purified salt product. In an embodiment, the naturally purified salt product comprises magnesium sulfate heptahydrate, magnesium sulfate hexahydrate, astrakanite, kieserite, or combinations thereof. In another embodiment, the purity of the magnesium sulfate heptahydrate is greater than 80 percent.

The salt mixture feedstock from which the salt product is recovered can be a number of starting materials, including bitterns or bittern salts (the mixture of salts remaining after sodium chloride is crystallized and harvested from sea water), legacy salts, salt brines obtained from springs, lakes or wells, salt ponds, underground deposits, evaporator discharge slurry or purge, or any mixed salt containing magnesium, sodium, potassium, chloride, sulfate ions, or combinations thereof. The starting feedstock salt mixture can contain a variety of naturally occurring salts and double salts, including compounds containing magnesium, sulfate, sodium, potassium and chloride ions either in solution or in a solid salt form, where at least a part of it is in solid form.

In another embodiment, the treating step is performed by a variety of processes. These include multi-stage, co-current, counter-current, single stage, batch or continuous processes to selectively dissolve the magnesium sulfate over the sodium chloride and other salts with the magnesium chloride solution. This can be done at a temperature range of about 90 degrees Fahrenheit (° F.) to about 150° F. (66° C.) and at a residence time of between one minute and two hours. In another embodiment the residence time is between about five minutes and one hour, and in yet another embodiment, between ten minutes and twenty minutes.

Following the treating step, in one embodiment the temperature of the first slurry can be maintained from the treating step to the first separation step. The crystallization step can comprise cooling the first liquid stream to a temperature of between 60° F. (16° C.) to 80° F. (27° C.). The separation steps can be performed by a number of methods, including by double-stage centrifuge, solid bowl centrifuge, screen bowl centrifuge, pusher centrifuge, decanter, wet screens, hydroclones, vacuum filters, belt filters, settling, or by combinations of any of these methods.

In an alternative embodiment the salt mixture is prepared prior to the treating step. This preparation step can be accomplished by reducing the size of the particles in the salt mixture, washing the salt mixture, grinding, de-watering, solids handling, or a combination of these steps. In another embodiment, the size reduction step comprises reducing the size of the salt mixture particles to a size of less than one inch. This can assist in increasing the surface area of the particles in the salt mixture prior to treatment with the solution. Another embodiment further comprises the steps of washing, cleaning, or drying the third solid, and combinations thereof of these steps, to yield a naturally purified salt product.

One embodiment relates to a method of producing high purity salt products from a salt mixture by treating the salt mixture with a first solution, where at least a portion of the solution comprises magnesium chloride, at a raised temperature to form a first slurry. This first slurry undergoes a first separation step to yield a first solid, where sodium chloride comprises at least a portion of the first solid, and a second slurry. Next, a second separation of the second slurry yields a second solid and a first liquid stream. The first liquid stream then undergoes a first crystallizing of a third solid in the first liquid stream to yield a third slurry. A third separating step of the third slurry yields a second liquid stream and a third solid, where at least a portion of the second liquid stream comprises magnesium chloride. The third solid then undergoes a dissolving step in a second solution to yield a third liquid stream. A second crystallizating of a fourth solid in the third liquid stream yields a fourth slurry. Finally, a fourth separation step of the fourth slurry yields a fourth liquid stream and a fourth solid, where at least a portion of the fourth liquid stream comprises magnesium sulfate, and where the fourth solid comprises a high purity salt product. Another embodiment further comprises the steps of washing, cleaning, or drying the fourth solid, and combinations thereof of these steps, to yield a high purity salt product. In one embodiment, the high purity salt product comprises magnesium sulfate heptahydrate, magnesium sulfate hexahydrate, astrakanite, kieserite, or combinations thereof. In another embodiment, the process results in a high purity salt product with a purity of greater than 97 percent on a dry weight basis (% dry wt. basis). In yet another embodiment, the high purity salt product meets the United States Pharmacopia (USP) standards for magnesium sulfate.

One of the benefits of the present invention is that it is a relatively closed system with minimal loss of materials. Moreover, many of the materials can be re-used throughout the process. For example, at least a portion of the second liquid stream that is recovered from the third separation step comprises a magnesium chloride solution or a heavy magnesium chloride brine. At least a portion of this second liquid stream can be recycled back into the beginning of the process and used as the solution to treat the salt mixture at an elevated temperature to form a first slurry. Similarly, other materials downstream in the process can be recycled upstream in the process such as by adding the second solution the fourth liquid stream recovered from the fourth separation step to the first liquid stream, to the first crystallization step, and/or to the dissolving step. Alternatively water may be used as the second solution added to the first liquid stream, to the first crystallization step, and/or to the dissolving step.

The present invention has the benefit of allowing recovery of naturally purified salt products of relatively high purity as compared to other known processes. In one embodiment, the purity of the naturally purified salt product comprising magnesium sulfate heptahydrate is at least 80% dry wt basis. In another embodiment, the process results in a high purity salt product with a purity of greater than 97% by weight. In yet another embodiment, the high purity salt product meets the United States Pharmacopia (USP) standards for magnesium sulfate. In an alternative embodiment, purifying the first solid comprising sodium chloride leads to the purity of the sodium chloride of greater than 70% dry wt. basis.

One of the advantages of the present invention is that it is capable of producing naturally purified salt product with a high purity and a high recovery percentage at the same time. It is possible to produce a naturally purified salt product with a purity greater than 90% dry wt. basis while at the same time having a relatively high recovery of greater than 50% by wt. In other processes, there is often a trade-off between obtaining higher recoveries and achieving high purity of the final product.

Another advantage of the disclosed method is the ability to recover the first solid which comprises sodium chloride. In one embodiment the purity of the sodium chloride is greater than 70% dry wt. basis. In another embodiment, the purity of the sodium chloride is greater than 80% dry wt. basis. In yet another embodiment, the purity of the sodium chloride is greater than 90% dry wt. basis. In another embodiment, the recovery of sodium chloride from the salt mixture is greater than 50% by wt.

BRIEF DESCRIPTION OF THE DRAWINGS

The present invention will become more fully understood from the detailed description given below and the accompanying drawings. These drawings are given by way of illustration only, and thus are not intended to be limiting of the present invention.

DETAILED DESCRIPTION

Selected Definitions

Figure 1:
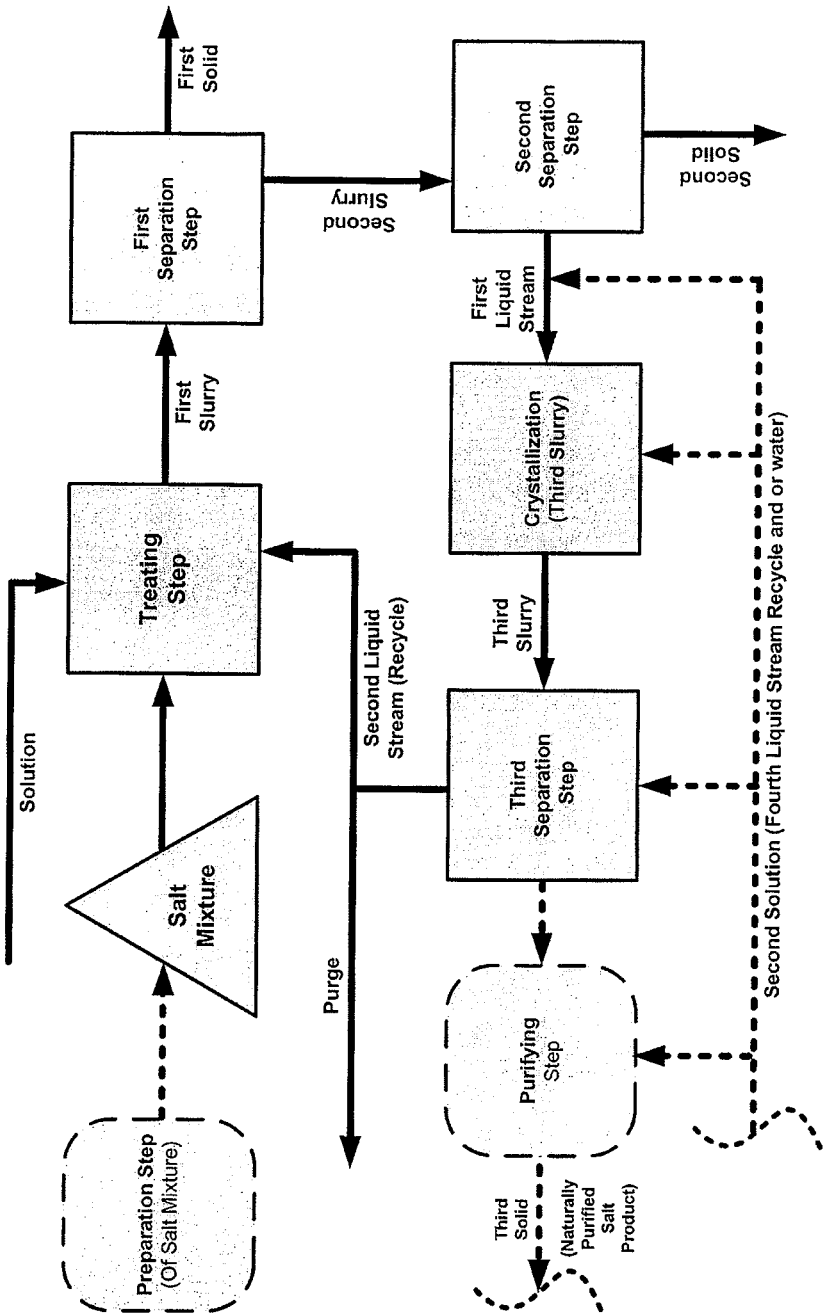
FIG. 1 is block diagram that illustrates an example of a method for producing a naturally purified salt product from a salt mixture.

As used herein the following terms shall have the following meanings:

The term "salt mixture" refers to a natural product starting material feedstock from which the salt product is recovered. The salt mixture feedstock from which the salt product is recovered can be any number of starting materials, including bitterns or bittern salts (the mixture of salts remaining after sodium chloride is crystallized and harvested from sea water), legacy salts, salt brines obtained from springs, lakes, wells, salt ponds, evaporator discharge slurry, discharge purge, underground deposits, or any mixed salt containing magnesium, sodium, potassium, sulfate and chloride ions. The starting feedstock salt mixture often contains a variety of naturally occurring salts and double salts, but at a minimum either contains compounds with magnesium, sulfate, sodium, and chloride, or with magnesium, sulfate, sodium, potassium and chloride ions in solution or in a slurry, where at least a portion is in solid phase.

The terra "naturally purified salt product" refers to the product primarily containing a magnesium sulfate salt such as magnesium sulfate, magnesium sulfate hexahydrate, magnesium sulfate heptahydrate, astrakanite, kieserite, or combinations thereof.

The term "treating" refers to any number of processes performed on the starting salt mixture to form a slurry by mixing with a solution, such as selective dissolution. These processes can include a multi-stage, co-current, counter-current, single stage, batch, or continuous process.

The term "solution" refers to the water-based solution used throughout the process such as in the treating step to form a slurry with the salt mixture. The solution primarily contains magnesium and chloride ions. The solution can also be a heavy brine solution such as the second liquid stream (at least a portion of which comprises magnesium chloride) recovered from the third separation step that can be recycled back to the treating step. The solution can also comprise the third liquid stream (at least a portion of which comprises magnesium sulfate) separated from the fourth slurry.

The term "first slurry" refers to the combination of the salt mixture with the solution.

The term "separating" refers to the step of disassociating a slurry into a majority of the solid portion from a majority of the liquid portion.

The ten III "first solid" refers to the primarily solid mixture comprising sodium chloride that is separated out of a first slurry.

The term "second slurry" refers to the compound resulting from the removal of the first solid from the first slurry in the first separation step.

The term "second solid" refers to the primarily solid mixture comprising potassium and other ions that is removed from the second slurry in the second separation step.

The term "first liquid stream" refers to the liquid separated out of the second slurry comprising magnesium, sulfate, and chloride ions. Other ions may also be present at lower levels, such as sodium and potassium.

The term "crystallizing" refers to any one of a series of techniques to obtain a product from a liquid mixture. The crystallizing step can be performed by any number of methods such as by a draft tube crystallizer, scraped surface crystallizer, various heat exchangers such as shell and tube or annular, sparge or inject, forced circulation, draft tube baffled, surface cooled, direct contact refrigeration crystallizer, batch crystallizer, or draft tube crystallizer.

The term "third solid" refers to the solid that is crystallized in the first liquid stream to form a third slurry, then separated out of the third slurry as a naturally purified salt product.

The term "third slurry" refers to the mixture resulting from the crystallization of the third solid in the first liquid stream.

The term "second liquid stream" refers to a liquid primarily containing magnesium chloride, such as a heavy brine solution. The second liquid stream can be recycled back into the process as the solution in the treating step.

The term "recycling" refers to the step of returning a co-product such as a liquid portion into an earlier step in the process.

The term "preparing" refers to the step of reducing the size, washing, grinding, de-watering, or solids handling of the salt mixture, or combinations thereof.

The term "high purity salt product" refers to the product primarily containing a magnesium sulfate salt such as magnesium sulfate, magnesium sulfate hexahydrate, magnesium sulfate heptahydrate, astrakanite, kierserite, or combinations thereof.

The term "fourth slurry" refers to the compound resulting from crystallizing of the fourth solid in the third liquid stream.

The term "third liquid stream" refers to the liquid resulting from dissolving the third solid in a second solution.

The term "second solution" refers to a water-based solution in which the third solid is dissolved, resulting in a third liquid stream. The second solution can comprise water or the fourth liquid stream where at least a portion of it comprises magnesium sulfate.

The term "fourth solid" refers to the solid mixture separated out of the fourth slurry that comprises a high purity salt product.

The term "fourth liquid stream" refers to the liquid separated from the fourth slurry, where at least a portion of it comprises magnesium sulfate. The fourth liquid stream can also be recycled back by adding it to the first liquid, to the first crystallization step, and/or to the dissolving step.

The term "particles" refers to the discreet crystals or agglomeration of the discreet crystals in the salt mixture.

The term "dissolving" refers to the step of putting the third solid in a second solution to yield a third liquid stream.

Overview

The present invention provides for various methods to produce naturally purified salt products from a salt mixture. In one embodiment, the salt mixture is treated with a solution comprising magnesium chloride at a temperature above ambient to form an initial slurry, which is then separated into a first solid comprising sodium chloride and a second slurry. The second slurry is then separated to yield a second solid comprising potassium and other ions and a first liquid stream. A third solid is then crystallized from the first liquid stream to yield a third slurry. This is followed by separation of the third solid from the third slurry to yield a second liquid stream and a naturally purified salt product comprising magnesium sulfate heptahydrate, magnesium sulfate hexahydrate, astrakanite, kieserite, or combinations thereof. In an embodiment, the method also allows recovery of sodium chloride as the first solid. In another embodiment, the solution comprising magnesium chloride can be recycled throughout the process or can be recovered as a product as well.

In other embodiments, additional steps may be used in conjunction with the method. For example, the salt mixture can be prepared prior to treating. In another embodiment, the naturally purified salt product can be further purified to produce a high purity salt product. For example, the third solid separated from the third slurry can undergo a dissolving step in a second solution to yield a third liquid stream. A second crystallizating of a fourth solid in the third liquid stream yields a fourth slurry. Finally, a fourth separation step of the fourth slurry yields a fourth liquid stream and a fourth solid, where at least a portion of the fourth liquid stream comprises magnesium sulfate, and where the fourth solid comprises a high purity salt product. Another embodiment further comprises the steps of washing, cleaning, or drying the fourth solid, and combinations thereof of these steps, to yield a high purity salt product. In one embodiment, the high purity salt product comprises magnesium sulfate heptahydrate, magnesium sulfate hexahydrate, astrakanite, kieserite, or combinations thereof.

The methods disclosed herein have several unique benefits. For example, the starting material salt mixture is a natural product, it is treated and processed using natural products, and the final products are natural and natural derived products. Also, there is minimal loss of materials since the process is essentially a closed system and can recycle products throughout the process. In addition, the present invention allows both higher yield and as well as high purity of the final product. And by using thermal heating in the method, the heat transfer is more efficient and less energy intensive than other processes. Finally, the methods allow recovery of several products, including magnesium sulfate, sodium chloride, and magnesium chloride.

Method for Producing Naturally Purified Salt Products

Figure 2:
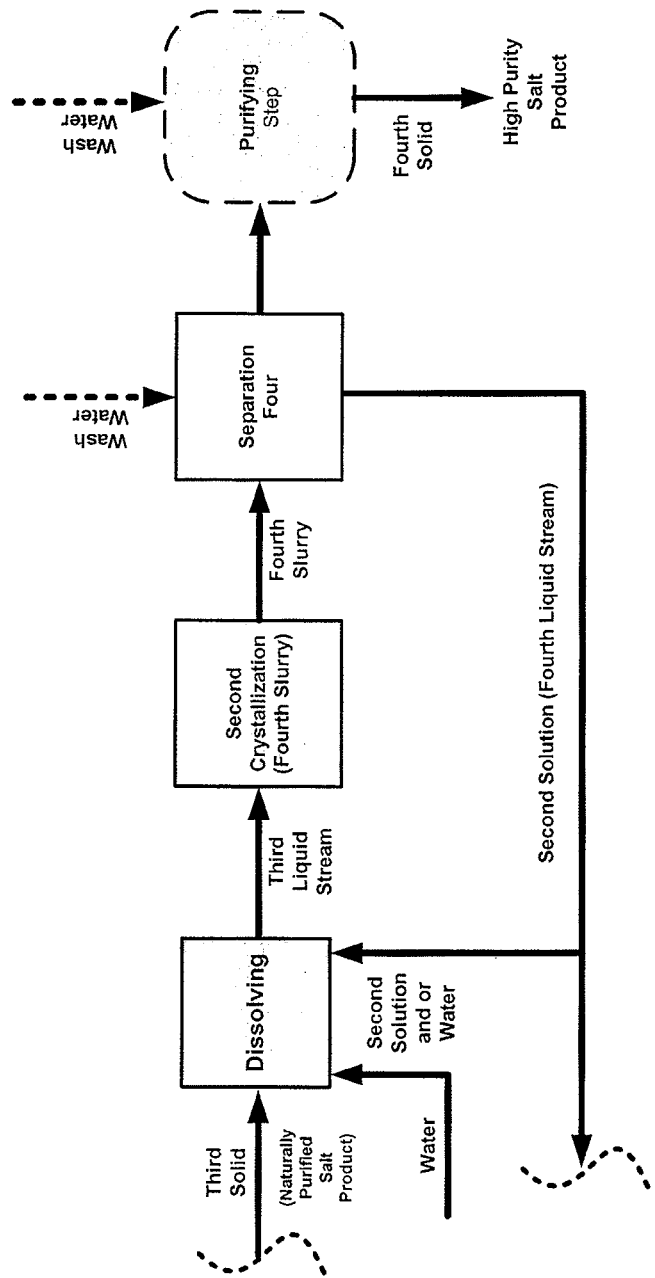
FIG. 2 is a block diagram that illustrates another example of a method for producing a high purity salt product.

For ease of understanding, methods of producing a naturally purified salt product and a high purity salt product are described below and with reference to FIGS. 1 and 2. Those skilled in the art will recognize, however, that aspects of such methods can be carried out in other systems.

Treating Step

The method involves treating a salt mixture with a solution at an elevated temperature to form a first slurry where the solution comprises magnesium chloride. The magnesium chloride solution is added to the starting material salt mixture to create a slurry. The treating step allows the magnesium chloride solution to selectively dissolve the magnesium sulfate over the sodium chloride as well as over any other salts in the salt mixture. Magnesium and sodium ions have a very similar chemistry and reactivity, which typically makes separation of the two difficult. Treating the salt mixture with a magnesium chloride solution to selectively dissolve magnesium sulfate allows separating of the sodium chloride from the slurry in solid form in the following step. In one embodiment, the treating step of selectively dissolving magnesium sulfate can be done via multi-stage, co-current, counter-current, single stage, batch, continuous process or combinations thereof. In another embodiment, the treating step is done by a single stage continuous process. In yet another embodiment the treating process is performed by a counter-current multi-stage continuous process.

The solution is a liquid where at least a portion of the solution comprises magnesium chloride. This can be made from a simple combination of adding solid magnesium chloride to water to faun a solution. Also, a bittern solution from any natural source such as salt water, lakes, ponds or underground deposits which contains magnesium chloride can be used as the solution. In one embodiment, at least a portion of the second liquid stream separated from the third slurry, which comprises a heavy magnesium chloride brine, can be used as solution in the treating step. This allows co-products to be recycled back through the process to increase efficiency and reduce loss of material.

The treating step occurs at a temperature above ambient. The temperature of the treating step can occur at about between 90° F. (32° C.) and 150° F. (66° C.). In another embodiment the temperature is between about 100° F. (38° C.) and 140° F. (60° C.). In another embodiment the temperature is between about 110° F. (43° C.) and 120° F. (49° C.) to allow selective dissolution to occur. The temperature can be elevated by any number of means, including heating the salt mixture, heating the solution prior to addition to the salt mixture, or heating the first slurry. In one embodiment, the magnesium chloride solution is heated prior to addition to the salt mixture. In one embodiment, the solution comprises about 10-31% by wt. of magnesium chloride, about 3-16% by wt. of magnesium sulfate, about 0-8% by wt. of sodium chloride, about 0-5% by wt. of potassium chloride, with the remainder of the solution comprising water. In another embodiment, the solution comprises about 20-30% by wt. of magnesium chloride, about 4-10% by wt. of magnesium sulfate, about 0.1-5% by wt. of sodium chloride, and about 0.1-2% by wt. of potassium chloride with the remainder of the solution comprising water. In another embodiment, the solution comprises about 18-24% by wt. of magnesium chloride, about 9-12% by wt. of magnesium sulfate, about 2-6% by wt. of sodium chloride, about 1-2.5% by wt. of potassium chloride, and the remainder of the solution comprising water.

The first slurry is created from the salt mixture and a solution comprising magnesium chloride, where the salt mixture typically comprises a variety of salts depending on the starting materiel feedstock. Magnesium, sodium, potassium, chloride, and sulfate ions are often present in the salt mixture. In one embodiment the percent solids by weight (% by wt.) of the first slurry comprises about from about 28% to about 50% by wt. solids or ions. In another embodiment, the percent solids of the first slurry comprises about from about 30% to 38% by wt. solids or ions. In one embodiment, the residence time for the treating step is at least one minute. In another embodiment, the residence time is one minute to two hours. In another embodiment, the residence time is five minutes to one hour. In yet another embodiment, the residence time is 10 minutes to 20 minutes.

First Separation Step

Following the treating step, the first slurry is separated to yield a first solid and a second slurry. At least a portion of the first solid comprises sodium chloride. One of the unique aspects of this step in combination with the treating step is that it allows separation of the magnesium sulfate by dissolving it into the solution while leaving the sodium chloride with higher purity and clearer cuts as compared to known methods or would be expected given the similar chemistry between them. In one embodiment, the temperature of the second slurry in the separation step is maintained at the same temperature of the treating step. The liquid-solid separation can be done by a variety of methods, including double-stage centrifuge, solid bowl centrifuge (decanter), screen bowl centrifuge, pusher centrifuge, decanter, wet screens, hydroclones, vacuum filters, belt filters, or by combinations of any of these methods. In one embodiment, a solid bowl centrifuge with a wet screen is used to separate the sodium chloride and the second slurry. In another embodiment, a pusher centrifuge is used. The magnesium sulfate, along with any other compounds such as other salts, suspended solids, other fine particles as well as magnesium chloride, remain in the second slurry.

In one embodiment, a centrifuge with a screen is used to separate out the fine particles to keep them from settling out with the sodium chloride, thereby increasing the purity of the sodium chloride. In one embodiment, 30-70 mesh screen is used. In one embodiment, the first solid comprising sodium chloride separated out can have purity greater than 70% on a dry wt. basis. In another embodiment, the purity of the sodium chloride is greater than 80% on a dry wt. basis, which is suitable for use in the solar salt making process. In addition to high purity, the process can obtain high recovery of the sodium chloride. In one embodiment, the recovery of the sodium chloride is greater than 50% by wt. In another embodiment, the recovery is greater than 60% by wt. In yet another embodiment, the recovery of the sodium chloride is greater than 70% by wt. Another advantage of this process is the high recovery rate in addition to the high purity level of the sodium chloride. In one embodiment, the recovery rate of the sodium chloride is from about 50% to about 75% by wt., and purity level is from about 70% to about 95% on a dry wt. basis.

Second Separation Step

Following the first separation step where a second slurry is separated out as well as a first solid, at least a portion of which contains sodium chloride, the second slurry undergoes a second separation step resulting in a second solid and a first liquid stream. The second solid comprises potassium ions in addition to other salts and ions. The separation step can be done by methods described above.

In one embodiment, less than 10% suspended solids by wt. remain in the first liquid stream that is to be crystallized. In another embodiment, the suspended solids remaining are less than 5% by wt. In another embodiment, the suspended solids remaining are less than 2% by wt.

Crystallizing Step Once the first liquid stream is separated out of the second slurry, a third solid is crystallized in it to yield a third slurry. The third solid slurry can comprise a magnesium sulfate hydrate, including magnesium sulfate heptahydrate (Epsom salts), magnesium sulfate hexahydrate (Hexandyrate), astrakanite, kierserite, or combinations thereof. In a preferred embodiment, the third solid comprises magnesium sulfate heptahydrate. Hexahydrate can be further treated to fog n magnesium sulfate heptahydrate.

In one embodiment the first liquid stream is cooled during the crystallization step. Several methods of cooling can be used, including direct contact cooling, surface cooling, vacuum cooling, or other types of cooling methods. In one embodiment, direct contact cooling can be done by bubbling a coolant into the body of the first liquid stream, such as by $CO_2$ gas, or by any type of heat transfer liquid. In another embodiment, surface cooling can be used. In this method of cooling, magnesium chloride may become encrusted on the sides of the crystallizer. This scaling issue can be resolved by flushing with water, re-heating and warming to re-dissolve the crystals formed on the sides. In another embodiment, vacuum cooling is used, which has the advantage of avoiding the scaling issues.

One of the advantages of the present invention is that crystallization is performed at temperatures above ambient temperature. In other processes where the crystallization is performed below ambient temperature (typically to 5° F. (−15° C.) or lower) to separate out magnesium sulfate, the cooler temperatures substantially increase the viscosity of the magnesium chloride, which can become almost like a lubricant compared to the magnesium sulfate. This can lead to scaling issues as well as high energy usage to cool the solution and evaporate the liquid. In contrast, the present invention avoids these issues and incurs less energy usage as the energy is used only for cooling and not evaporation (sensible cooling) with little to no net evaporation. And the lower viscosity of the magnesium chloride when at higher temperatures also leads to better separation.

In an embodiment, the crystallizing step can be performed by any number of methods such as by a draft tube crystallizer, scraped surface crystallizer, various heat exchangers such as shell and tube or annular, sparge or inject. Other types are forced circulation, draft tube baffled, surface cooled, direct contact refrigeration crystallizer, batch crystallizer. In one preferred embodiment, a draft tube crystallizer is used, which is essentially a continuous stirred tank. In one embodiment, the first liquid stream entering the crystallizer (i.e., the crystallizer feed temperature) is at the same temperature as in the treating step and the separating step of between about 90° F. (32° C.) and 150° F. (66° C.). In one embodiment, the first liquid stream is cooled to a temperature of between about 50° F. (10° C.) and 140° F. (60° C.). In another embodiment, the temperature of the first liquid stream is between about 100° F. (38° C.) and 130° F. (54° C.) as it enters the crystallizer. In yet another embodiment, the temperature of the first liquid stream as it enters the crystallizer is between about 119° F. (48° C.) and 122° F. (50° C.). The first liquid stream is then cooled in the crystallizer from the temperature in the treating and separating step in another embodiment. In one embodiment, the temperature of the first liquid stream is cooled in the crystallizer by methods as described above to a temperature of about 60° F. (16° C.) to about 80° F. (27° C.) to yield a third slurry. In another embodiment, the temperature is about 67° F. (19° C.) to about 72° F. (22° C.). In yet another embodiment, the temperature is about 68° F. (20° C.) to about 70° F. (21° C.). The third slurry in the crystallizer tank will be at a temperature range of about 60° F. (16° C.) to about 80° F. (27° C.). In an alternative embodiment, the first solution in the crystallizer is heated up to a temperature of about 250° F. (121° C.) to produce kieserite.

In one embodiment, the first liquid stream will enter the crystallizer at about the same rate as it is discharged from the crystallizer tank as the third slurry. When the first liquid stream is added to the crystallizer (essentially as a supersaturated liquid), it is mixed with the third slurry, dispersed, and crystallizes by growing onto the crystals already in the third slurry. In one embodiment, the residence time is 2 to 7 hours (by way of example, a 200 gallon crystallizer tank with an input/output rate of about 0.6 gpm=τ=333 minutes). In another embodiment, residence time is about 3 to 5 hours. In one embodiment, the first liquid stream will undergo approximately three turnovers per minute, which will result in sufficiently homogenous mixing. In an embodiment, water can be added to the first liquid stream or third slurry to prevent co-precipitation of sodium chloride at ambient temperatures and at a rate of about 2-4% of the first liquid stream. In another embodiment, the second solution comprising the fourth liquid stream, water, or both, can be added to the first liquid stream or third slurry of the crystallization step. In an embodiment, the third slurry is a combination of solids and liquids, where the third solid is crystallized in the first liquid stream.

Third Separating Step

Following the crystallization step, the third solid is separated from the third slurry to yield a second liquid stream and a naturally purified salt product. The naturally purified salt product can comprise magnesium sulfate heptahydrate, magnesium sulfate hexahydrate, astrakanite, kieserite, or combinations thereof. This liquid-solid separating step can be performed using any of the same methods of the previous separating step, including double-stage centrifuge, solid bowl centrifuge (decanter), screen bowl centrifuge, pusher centrifuge, decanter, wet screens, hydroclones, vacuum filters, belt filters, or by combinations of any of these methods. In one embodiment, a pusher centrifuge is used for separation. In another embodiment, a vacuum filter is used for separation. In one embodiment, the second solution comprising the fourth liquid stream, water, or both, can be added to the third slurry of the third separation step. In another embodiment, at least a portion of the third solid may be re-added to the first crystallization step to increase the slurry density and improve crystal growth.

In one embodiment, the second liquid stream recovered from the separation step comprises a magnesium chloride solution (a heavy magnesium chloride brine) that undergoes a purge. In one embodiment the purge is 25% to 50%. In another embodiment, at least a portion of the purge can be added to the starting material salt mixture in order to recycle and reuse it. The second liquid stream comprising magnesium chloride has a variety of commercial uses such as a dust suppressor, a deicer, anti-icer, or pre-wetting agent. At least a portion of the second liquid stream can also be recycled back into the process as the solution in the treating step.

The third solid recovered from the third separation step will comprise a naturally purified salt product such as magnesium sulfate heptahydrate. In one embodiment the purity of this product is greater than 80% by wt. In another embodiment, the purity of the product is greater than 90% by wt. In yet another embodiment, purity of greater than 95% by wt. can be achieved. The recovery percentage of the naturally purified salt product is also relatively high. In one embodiment, the recovery of the naturally purified salt product is greater than 50% by wt.

Another embodiment further comprises purifying steps such as steps of washing, cleaning, or drying the fourth solid, and combinations thereof of these steps, to yield a high purity salt product. In one embodiment, these steps are performed after the fourth separating step.

Method for Producing High Purity Salt Products

The present disclosure also relates to a method for producing high purity salt products. In one embodiment, the third solid separated from the third slurry can undergo a purifying step to yield a high purity salt product. Any number of methods can be used in this step, including dissolving, crystallizing, separating, washing, cleaning, drying, or any combination of these steps. The separation steps and the crystallizing steps can be performed as described herein. In one embodiment, in addition to the steps disclosed above, the method comprises the steps of dissolving, crystallizing, and separating.

Dissolving Step After the third separating step on the third slurry yields a third solid and a second liquid stream, the third solid can then be dissolved in a second solution to yield a third liquid stream. The dissolving step can occur at an elevated temperature, wherein the temperature is in the range of about 90° F. (32° C.) to about 150° F. (66° C.). In another embodiment, the temperature is at about 100° F. (38° C.) to about 140° F. (60° C.). In yet another embodiment, the temperature is about 110° F. (43° C.) to about 120° F. (49° C.). In one embodiment, the second solution used to dissolve the third solid can be water, at least a portion of the fourth liquid stream, or a combination thereof. By recycling back the fourth liquid stream as the second solution, loss of materials is minimized.

Second Crystallizing Step

Once the third liquid stream is formed in the dissolving step, a second crystallizing step to crystallize out a fourth solid in the third liquid stream yields a fourth slurry. The crystallization step can be performed as disclosed herein.

Fourth Separation Step

Finally, a fourth separation step on the fourth slurry yields a fourth liquid stream and a fourth solid, where at least a portion of the fourth liquid stream comprises magnesium sulfate, and where the fourth solid comprises a high purity salt product. In one embodiment, the high purity salt product comprises magnesium sulfate heptahydrate, magnesium sulfate hexahydrate, astrakanite, kieserite, or combinations thereof. In one embodiment, the high purity salt product comprises magnesium sulfate heptahydrate (Epsom salts).

In another embodiment, the process results in a high purity salt product with a purity of greater than 97 percent on a dry weight basis (% dry wt. basis). In yet another embodiment, the high purity salt product meets the United States Pharmacopia (USP) standards for magnesium sulfate. In one embodiment, the second solution comprising water, the fourth liquid stream, or both can be added to the fourth slurry in the fourth separation step. In one embodiment, about 90% of the particle size of the high purity salt product is greater than 50 mesh. In addition, the purity of the high purity salt product in one embodiment is greater than 90% dry wt. basis. In another embodiment, it is greater than 95% dry wt. basis. In yet another embodiment, it is greater than 98% dry wt. basis.

Further Purifying Steps

In another embodiment, the third solid or fourth solid processed through these steps can alternatively be washed, cleaned and/or dried by processes well-known in the industry. In one embodiment, the high purity salt product obtained from purifying step comprising magnesium sulfate heptahydrate has a purity of greater than 97% by weight. In another embodiment, the purity of the high purity salt product is greater than 98% by weight. In yet another embodiment, the purity of the high purity salt product is greater than 99% by weight.

Preparation Step

The salt mixture can undergo a preparation step prior to the treating step. In some instances, the salt mixture may contain impurities such as excessive water, high amounts of unwanted compounds including other salts, or other products such as dirt. In other instances, the particles in the salt mixture may be of a very large size. In order to ease use and handling of the salt mixture, the salt mixture may be prepared prior to treating. In one embodiment, the preparation step comprises size reduction, washing, grinding, de-watering, solids handling, or combinations of any of the above, on the salt mixture. These steps can be performed by any methods well-known in the industry. In another embodiment, the preparation step comprises reducing the size of the particles of the salt mixture to less than one inch.

EXAMPLES

Aspects of the method for producing naturally purified salt products and high purity salt products that have a variety of uses are illustrated in the following examples. In these examples, it is shown that successful production of these salt products is achievable by the processes disclosed.

Example 1

In the first example, 163 gallons of 24 weight percent magnesium chloride solution are pumped into a 300 gallon jacketed mixing tank. The solution is mixed with an axial flow impeller at the rate of 2500 gallons per minute (gpm) and heated through the tank jacket to 135° F. (57° C.) with low pressure steam. Next, 765 pounds (Lbs) of salt mixture is then dropped into the mixing tank resulting in the first slurry. The tank is mixed for 18 minutes while maintaining the temperature of 122° F. (50° C.). Upon completion of the residence time the slurry is pumped to a pusher type centrifuge, Baker Perkins model S-8. The centrifuge basket has screen gaps of 13 tenths of an inch and operated at 1800 revolutions per minute (RPM). The first slurry contains 39 weight percent suspended solids. The first solid comprising sodium chloride is separated from the first slurry yielding the second slurry. The second slurry continues to a second jacketed mixing tank (surge tank), which is the same design as the previous mixing tank mixed at a lower rate of 1750 gpm. The second slurry contains 16 weight percent suspended solids and is processed with a Siebtechnik horizontal solid bowl decanter type centrifuge. The second solid is collected while yielding the first liquid stream, which is discharged to a jacketed surge tank. The first liquid contains 1.5 weight percent suspended solids and the second solid has approximately 47 weight percent entrained brine.

The first liquid stream is pumped from the surge tank at 132° F. (56° C.) and inline mixed with water which prevents or limits the crystallization of sodium chloride in the crystallizer. The water addition rate is 45 Lbs per hour corresponding to the first liquid stream rate. The first liquid is pumped into a draft tube baffled vacuum evaporation crystallizer from the heated surge tank at 122° F. (50° C.) at a rate of 1.1 gpm. The crystallizer is operated at the temperature of 70° F. (21° C.) and the absolute pressure of 11 mmHg. The first liquid stream is immediately mixed with the third slurry upon entering the crystallizer and cooled by vacuum evaporation. Seventy percent of the evaporated water is condensed inside a shell and tube heat exchanger and refluxed back into the crystallizer. From the crystallizer the third slurry is pumped into a 50-gallon tank and settled. The third slurry is thickened by decanting some portion of the second liquid stream and is pumped back into the crystallizer or to the centrifuge feed mixing tank. The natural weight percent suspended solid inside the crystallizer is 8 weight percent but is increased to 20 weight percent suspended solids with this technique. From the centrifuge feed mixing tank the thickened third slurry (59 weight percent suspended solids) is gravity fed to a KMPT pusher centrifuge. The centrifuge model operated is the SZ 21 centrifuge with screen gaps of 508 thousandths of an inch. The solids are washed on the centrifuge with the fourth liquid stream and/or water. The application rate of the fourth liquid stream as the wash is 0.06 pounds of fourth liquid per pound of third solid. The application rate of water as the wash is 0.05 pounds of water per pound of third solid. The third solid or naturally purified salt is separated from the second liquid stream. See Tables 1, 2, and 3 for all compositions.

TABLE 1

Salt Mixture Composition as estimated compounds and as Ions

| $MgSO_4$ | $MgCl_2$ | KCl | NaCl | $Na_2SO_4$ | Water | INSOLUBLE Material |
|---|---|---|---|---|---|---|
| 24% | 0% | 8% | 38% | 5% | 25% | 1% |

| $Mg^{+2}$ | $Na^{+1}$ | $K^{+1}$ | $Cl^{-1}$ | $SO_4^{-2}$ | Water | INSOLUBLE Material |
|---|---|---|---|---|---|---|
| 6% | 16% | 4% | 27% | 22% | 25% | 1% |

TABLE 2

Composition data for all liquid and solid streams

| Source Stream or Solid | $MgSO_4$ | $MgCl_2$ | KCl | NaCl | Water | Insoluble |
|---|---|---|---|---|---|---|
| Solution (magnesium chloride) | 6% | 24% | 1% | 2% | 68% | NA |
| First Liquid Stream | 10% | 20% | 2% | 3% | 66% | NA |
| First Solid | 4% | 0.4% | 1% | 95% | 0.1% | NA |
| Second Solid | 28% | 10% | 13% | 12% | 37% | 1% |
| Second Liquid Stream | 6% | 21% | 1% | 3% | 69% | NA |
| Fourth Liquid Stream | 22% | 1% | 0.1% | 1% | 76% | NA |
| Third Solid Unwashed | 50% | 1% | 0.1% | 0.2% | 49% | NA |
| Third Solid washed with Second Solution (Fourth Liquid Stream) | 50% | 1% | 0.1% | 0.1% | 49% | NA |
| Third Solid washed with water | 48% | 0.0% | 0.0% | 0.4% | 52% | NA |

TABLE 3

Screen data of naturally purified salt product

| US Mesh | Weight Percent On |
|---|---|
| 12 | 0.0% |
| 16 | 0.0% |
| 20 | 0.9% |
| 30 | 20.6% |
| 40 | 39.2% |
| 50 | 25.1% |
| 60 | 4.5% |
| 70 | 6.5% |
| 100 | 2.3% |
| 140 | 0.8% |
| 200 | 0.1% |
| pan | 0.1% |

Example 2

In the second example, 173 gallons of 26 weight percent magnesium chloride solution is pumped into a 300 gallon jacketed mixing tank. The solution is mixed with an axial flow impeller at the rate of 2500 gpm and heated through the tank jacket to 135° F. (57° C.) with low pressure steam. Next, 739 Lbs of salt mixture is then dropped into the mixing tank resulting in the first slurry. The tank is mixed for 22 minutes while maintaining the temperature of 123° F. (51° C.). Upon completion of the residence time the slurry is pumped to a pusher type centrifuge, Baker Perkins model S-8. The centrifuge basket has screen gaps of 13 tenths of an inch and operates at 1800 RPM. The first slurry contains 35 weight percent suspended solids. The first solid comprising sodium chloride is separated from the first slurry yielding the second slurry. The second slurry continues on to a second jacketed mixing tank (surge tank), which is the same design as the previous mixing tank mixed at a lower rate of 1750 gpm. The second slurry contains 10 weight percent suspended solids and is processed with a Siebtechnik horizontal solid bowl decanter type centrifuge. The second solid is collected while yielding the first liquid stream, which is discharged to a jacketed surge tank. The first liquid contains 1.5 weight percent suspended solids and the second solid has approximately 37 weight percent entrained brine.

The first liquid stream is pumped from the surge tank at 133° F. (56° C.) and inline mixed with water which prevents or limits the crystallization of sodium chloride in the crystallizer. The water addition rate is 45 Lbs per hour. The first liquid is pumped into a draft tube baffled vacuum evaporation crystallizer from the heated surge tank at 122° F. (50° C.) at a rate of 0.7 gpm. The crystallizer is operated at a temperature of 69° F. (21° C.) and an absolute pressure of 11 mmHg. The first liquid stream is immediately mixed with the third slurry upon entering the crystallizer and cooled by vacuum evaporation. Seventy four percent of the evaporated water is condensed inside a shell and tube heat exchanger and refluxed back into the crystallizer. From the crystallizer the third slurry is pumped into a 50-gallon tank and settled. The third slurry is thickened by decanting some portion of the second liquid stream and is pumped to another mixing tank. The natural weight percent suspended solid inside the crystallizer is 9 weight percent. From the mixing tank the thickened third slurry (45 weight percent suspended solids) is gravity fed to a KMPT type pusher centrifuge. The centrifuge model operated is the SZ 21 centrifuge with screen gaps of 5.08 thousandths of an inch. The solids are washed on the centrifuge with the fourth liquid stream. The application rate of the fourth liquid stream as the wash is 0.06 pounds of fourth liquid per pound of third solid. The third solid or naturally purified salt is separated from the second liquid stream. See Tables 4, 5, and 6 for all compositions.

TABLE 4

Salt Mixture Composition as estimated compounds and as Ions

| $MgSO_4$ | $MgCl_2$ | KCl | NaCl | $Na_2SO_4$ | Water | INSOLUBLE Material |
|---|---|---|---|---|---|---|
| 27% | 0% | 6% | 28% | 6% | 33% | 3% |

| $Mg^{+2}$ | $Na^{+1}$ | $K^{+1}$ | $Cl^{-1}$ | $SO_4^{-2}$ | Water | INSOLUBLE Material |
|---|---|---|---|---|---|---|
| 7% | 12% | 3% | 20% | 25% | 25% | 3% |

TABLE 5

Composition data for all liquid and solid streams

| Source Stream or Solid | $MgSO_4$ | $MgCl_2$ | KCl | NaCl | Water | Insoluble |
|---|---|---|---|---|---|---|
| Solution | 4% | 26% | 0.3% | 2% | 68% | NA |
| First Liquid Stream | 10% | 20% | 2% | 3% | 65% | NA |
| First Solid | 17% | 1% | 5% | 63% | 14% | NA |
| Second Solid | 23% | 7% | 11% | 22% | 37% | NA |
| Second Liquid Stream | 5% | 21% | 1% | 3% | 70% | NA |
| Fourth Liquid Stream | 22% | 1% | 0.1% | 1% | 76% | NA |
| Third Solid Unwashed | 51% | 1% | 0.1% | 0.1% | 48% | NA |
| Third Solid washed with water | 50% | 1% | 0.0% | 0.1% | 49% | NA |

TABLE 6

Screen data of naturally purified salt product

| US Mesh | Weight Percent On |
|---|---|
| 12 | 0.0% |
| 16 | 0.0% |
| 20 | 1.2% |
| 30 | 26.3% |
| 40 | 33.8% |
| 50 | 20.6% |
| 60 | 4.0% |
| 70 | 4.8% |
| 100 | 3.8% |
| 140 | 2.7% |
| 200 | 0.9% |
| pan | 1.3% |

Naturally purified salt (Third Solid) from example 1 is dissolved in water inside the jacketed mixing tank to yield the third liquid stream. The dissolving takes place at a temperature of 125° F. (52° C.) and is heated by way of low pressure steam. The third liquid stream is pumped from the mixing tank into a jacketed surge tank to maintain the temperature of 133° F. (56° C.). The third liquid stream is then pumped into the draft tube baffled vacuum evaporation crystallizer at 130° F. (54° C.), which contains the fourth slurry. The crystallizer temperature is operated at 65° F. (18° C.) and the absolute pressure is 15 mmHg. Seventy four percent of the evaporated water is condensed and refluxed back into the crystallizer. The fourth slurry (23 weight percent suspended solids) is discharge from the crystallizer into the 50-gallon thickening tank. The fourth slurry is thickened by decanting a portion of the fourth liquid stream from the 50-gallon tank. The thickened fourth slurry (36 weight percent suspended solids) is then pumped to the centrifuge feed tank. The fourth slurry is gravity fed to a KMPT pusher centrifuge model SZ 21 with screen gaps of 5.08 thousandths of an inch. The high purity salt product is separated and washed with water. The rate of wash water applied is 0.3 pounds per pound of solids. Compositions of all streams are in Tables 7 and 8.

TABLE 7

Compositions of streams and solids from purification of naturally purified salt to a high purity salt, composition listed have a combination of ppm and weight percent units.

| Source Stream or Solid | MgSO$_4$ | MgCl$_2$ | KCl | NaCl | Water |
|---|---|---|---|---|---|
| Third Liquid Stream | 30% | 0.7% | 0.1% | 0.2% | 69% |
| Fourth Liquid Stream | 25% | 0.6% | 700 ppm | 0.5% | 74% |
| High Purity Solid Washed (Water) | 47% | 0.0% | 40 ppm | 60 ppm | 53% |
| High Purity Solid Unwashed | 48% | 500 ppm | 20 ppm | 0.0% | 52% |

TABLE 8

Screen data of naturally purified salt product

| US MESH | Weight Percent On |
|---|---|
| 12 | 0.1% |
| 16 | 3.0% |
| 20 | 18.9% |
| 30 | 42.5% |
| 40 | 19.8% |
| 50 | 9.4% |
| 60 | 1.0% |
| 70 | 3.2% |
| 100 | 1.2% |
| 140 | 0.7% |
| 200 | 0.0% |
| Pan | 0.1% |

As stated above, the foregoing is merely intended to illustrate various embodiments of the present invention. The specific modifications discussed above are not to be construed as limitations on the scope of the invention. It will be apparent to one skilled in the art that various equivalents, changes, and modifications may be made without departing from the scope of the invention, and it is understood that such equivalent embodiments are to be included herein. All references cited herein are incorporated by reference as if fully set forth herein.

We claim:

1. A method for producing a naturally purified salt product from a salt mixture comprising the naturally purified salt product and sodium chloride, comprising the steps of:
    a. treating the salt mixture with a solution at an elevated temperature to form a first slurry, wherein at least a portion of the solution comprises magnesium chloride;
    b. a first separating of the first slurry to yield a first solid and a second slurry, wherein at least a portion of the first solid comprises sodium chloride;
    c. a second separating of the second slurry to yield a second solid and a first liquid stream;
    d. crystallizing a third solid in the first liquid stream to yield a third slurry, and
    e. a third separating of the third slurry to yield a second liquid stream and a third solid, wherein at least a portion of the second liquid stream comprises magnesium chloride, and wherein the third solid comprises a naturally purified salt product.

2. The method of claim 1 wherein the naturally purified salt product comprises magnesium sulfate heptahydrate, magnesium sulfate hexahydrate, astrakanite, kieserite, or combinations thereof.

3. The method of claim 2, wherein the purity of the magnesium sulfate heptahydrate is greater than 80% dry wt. basis.

4. The method of claim 1 wherein the salt mixture contains magnesium, sulfate, sodium, potassium and chloride ions; legacy salts; bitterns; bittern salts; salt brines from springs, lakes, wells, salt ponds or underground deposits; evaporator discharge slurry or purge; any mixed salt containing magnesium, sodium, chloride, potassium or sulfate ions; or combinations thereof.

5. The method of claim 1, wherein the treating step comprises a multi-stage, co-current, counter-current, single stage, batch, or continuous process and is performed at a temperature in the range of 90° F. to 150° F. and at a residence time of between one minute and two hours; wherein the crystallization step further comprises cooling the first liquid stream to a temperature of between 60° F. to 80° F.; and wherein the separation steps are performed by double-stage centrifuge, solid bowl centrifuge, screen bowl centrifuge, pusher centrifuge, decanter, wet screens, hydroclones, vacuum filters, belt filters, or combinations thereof.

6. The method of claim 1 further comprising a recycling step, wherein at least a portion of the second liquid stream recovered from the third separation step comprises the solution in the treating step.

7. The method of claim 1 further comprising preparing the salt mixture, wherein the preparation step comprises size reduction, washing, grinding, de-watering, solids handling, or combinations thereof, and wherein the size reduction step further comprises reducing the size of particles in the salt mixture to less than one inch.

8. The method of claim 1 further comprising the steps of washing, cleaning, drying, or combinations thereof, of the third solid.

9. The method of claim 1 wherein the purity of the sodium chloride is greater than 70% dry wt. basis.

10. A method for producing a high purity salt product from a salt mixture, comprising the naturally purified salt product and sodium chloride, comprising the steps of:
   a. treating the salt mixture with a first solution at an elevated temperature to form a first slurry, wherein at least a portion of the solution comprises magnesium chloride;
   b. a first separating of the first slurry to yield a first solid and a second slurry, wherein at least a portion of the first solid comprises sodium chloride;
   c. a second separating of the second slurry to yield a second solid and a first liquid stream;
   d. a first crystallizing of a third solid in the first liquid stream to yield a third slurry;
   e. a third separating of the third slurry to yield a second liquid stream and the third solid, wherein at least a portion of the second liquid stream comprises magnesium chloride;
   f. dissolving the third solid in a second solution to yield a third liquid stream;
   g. a second crystallizing of a fourth solid in the third liquid stream to yield a fourth slurry; and
   h. a fourth separating of the fourth slurry to yield a fourth liquid stream and the fourth solid, wherein at least a portion of the fourth liquid stream comprises magnesium sulfate, and wherein the fourth solid comprises a high purity salt product.

11. The method of claims 10 further comprising the steps of washing, cleaning, drying, or combinations thereof, of the fourth solid.

12. The method of claim 10 wherein the high purity salt product comprises magnesium sulfate heptahydrate magnesium sulfate hexahydrate, astrakanite, kieserite, or combinations thereof.

13. The method of claim 12 wherein the high purity salt product has a purity of greater than 97% dry wt. basis.

14. The method of claim 12 wherein the high purity salt product meets the United States Pharmacopia standards for magnesium sulfate.

15. The method of claim 10 wherein the salt mixture contains magnesium, sulfate, sodium, potassium and chloride ions; legacy salts; bitterns; bittern salts; salt brines from springs, lakes, wells, salt ponds or underground deposits; evaporator discharge slurry or purge; any mixed salt containing magnesium, sodium, chloride, potassium or sulfate ions; or combinations thereof.

16. The method of claim 10, wherein the treating step comprises a multi-stage, co-current, counter-current, single stage, batch, or continuous process and is performed at a temperature in the range of 90° F. (32° C.) to 150° F. (66° C.) and at a residence time of between one minute and two hours; wherein the crystallization step further comprises cooling the first liquid stream to a temperature of between 60° F. (16° C.) to 80° F. (27° C.); and wherein the separation steps are performed by double-stage centrifuge, solid bowl centrifuge, screen bowl centrifuge, pusher centrifuge, decanter, wet screens, hydroclones, vacuum filters, belt filters, or combinations thereof.

17. The method of claim 10 further comprising a recycling step, wherein at least a portion of the second liquid stream recovered from the third separation step comprises the solution in the treating step.

18. The method of claim 1 further comprising preparing the salt mixture, wherein the preparation step comprises size reduction, washing, grinding, de-watering, solids handling, or combinations thereof, and wherein the size reduction step further comprises reducing the size of particles in the salt mixture to less than one inch.

19. The method of claim 10 further comprising adding as the second solution the fourth liquid stream recovered from the fourth separation step, water, or combinations thereof, to the first liquid stream, to the first crystallization step, and/or to the dissolving step.

20. The method of claim 10 wherein the purity of the sodium chloride is greater than 70% dry wt. basis.

* * * * *

UNITED STATES PATENT AND TRADEMARK OFFICE
CERTIFICATE OF CORRECTION

PATENT NO.       : 8,951,305 B2
APPLICATION NO.  : 13/322762
DATED            : February 10, 2015
INVENTOR(S)      : Matthew L. Bollinger et al.

It is certified that error appears in the above-identified patent and that said Letters Patent is hereby corrected as shown below:

In the Specification

In column 5, line 46, del "terra" and insert -- term --, therefor.

In column 6, line 4, del "ten III" and insert -- term --, therefor.

In the Claims

In column 19, line 18, in claim 10, del "mixture," and insert -- mixture --, therefor.

Signed and Sealed this
Twenty-first Day of July, 2015

Michelle K. Lee
*Director of the United States Patent and Trademark Office*